Patented Oct. 28, 1952

2,615,902

UNITED STATES PATENT OFFICE 2,615,902

CHEMICAL COMPOUNDS AND PROCESSES FOR PREPARING THE SAME

Ralph F. Hirschmann, Westfield, and Norman L. Wendler, Linden, N. J., assignors to Merck & Co., Inc., Rahway, N. J., a corporation of New Jersey No Drawing. Application October 24, 1950, Serial No. 191,924

15 Claims. (Cl. 260—397.1)

This invention relates to desoxycholic acid, more particularly to a process for preparing desoxycholic acid, and specifically to an improved process for converting 3,12-dihydroxy-7-ketocholanic acid to desoxycholic acid.

Desoxycholic acid (3,12 - dihydroxycholanic acid), which is important as a starting material for preparing Kendall's Compound E (17-hydroxy-11-dehydrocorticosterone), is one of the natural constituents of animal bile and is recovered commercially in small amounts from ox bile. Unfortunately, the quantity of desoxycholic acid available from this source is very limited and therefore every effort has been made to find other sources of this important compound. The U. S. Patents 2,321,598 and 2,374,680 describe one process for converting cholic acid (3,7,12-trihydroxycholanic acid) or derivatives thereof, to desoxycholic acid comprising selectively oxidizing cholic acid to 3,12-dihydroxy-7-ketocholanic acid, forming the semicarbazone or hydrazone of this acid, and decomposing said semicarbazone or hydrazone with an alkali to obtain the desired desoxycholic acid. However, this process is not particularly suited for the preparation of large quantities of desoxycholic acid since large amounts of the expensive reagents semicarbazide or hydrazine hydrate are required.

This invention is concerned with an improved process for converting 3,12-dihydroxy-7-ketocholanic acid to desoxycholic acid. It is one object of our present invention to provide a convenient and inexpensive method for preparing desoxycholic acid from 3,12-dihydroxy-7-ketocholanic acid. It is a further object to provide valuable intermediate products which can be readily converted to desoxycholic acid. Other objects will be apparent from the detailed description hereinafter provided.

In accordance with our invention, these objects are achieved by reacting a 3,12-diacyloxy-7-ketocholanic acid or an ester thereof with an acylating agent in the presence of an acid catalyst to form the corresponding enol acylate, reducing this enol acrylate with hydrogen in the presence of a hydrogenation catalyst, and hydrolyzing the resulting 3,12-acyloxycholanic acid or ester to obtain the desired desoxycholic acid. This process may be represented as follows:

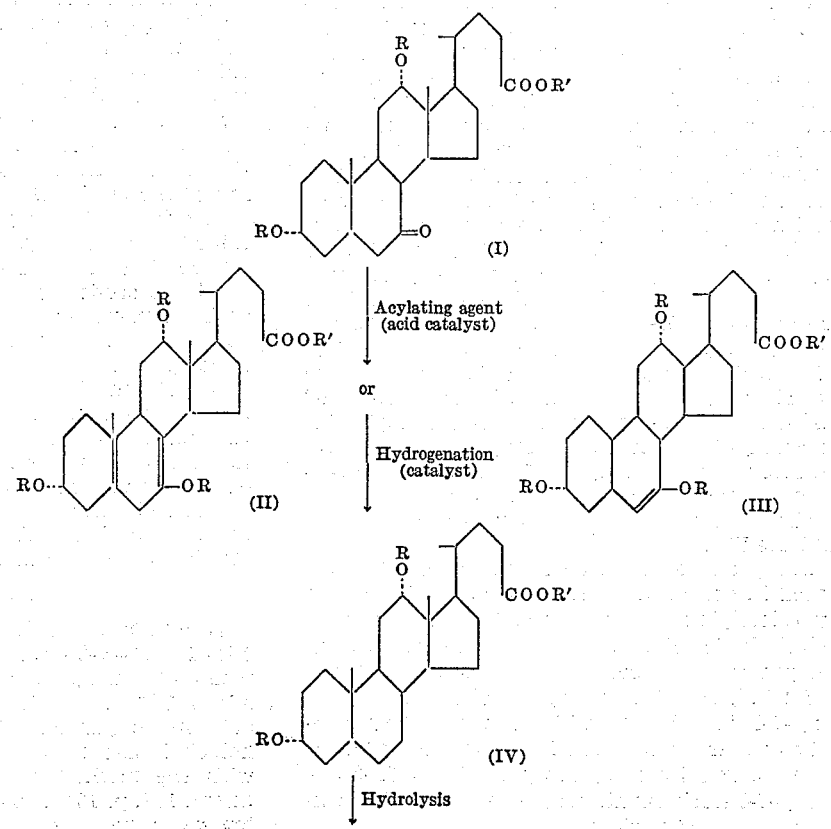

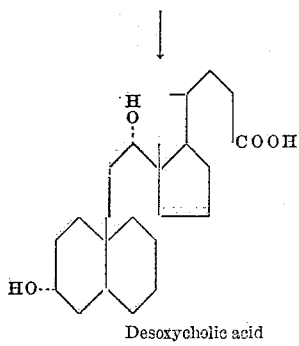

Desoxycholic acid wherein R represents a substituent such as an acyl group hydrolyzable to hydroxyl, and R₁ represents hydrogen, alkyl, aryl or aralkyl.

In the reaction flow sheet shown above, the intermediate enol acylate is represented by the alternative Formulas II and III. It is not known at this time whether the structure of the enol acylate is correctly represented by II or III. It is also possible that the enol acylate obtained by our process is a mixture of II and III.

When a 3,12-diacyloxy-7-ketocholanic acid is utilized as the starting material, as shown in the foregoing flow sheet, the intermediate enol acylate obtained may be in the form of the free acid shown in the flow sheet or it is possible that under the reaction conditions a mixed anhydride resulting from the reaction of the free carboxylic acid group of the cholanic acid with the acylating agent may be formed. Alternatively, it is possible that under the reaction conditions, an anhydride is formed from 2 mols of the cholanic acid. However, such anhydrides, if formed, would be hydrolyzed to form the free acid in the last step of the process when the acyl groups are removed.

Suitable starting materials for the process of our invention are 3,12-dihydroxy-7-ketochlolanic acids and esters thereof wherein the 3 and 12 hydroxyl groups are protected by hydrolyzable substituents such as acyl groups, for example, acetyl, propionyl, butyryl, benzoyl, benzene sulfonyl, and the like. We have obtained particularly satisfactory results with our process by utilizing as a starting material an acylated derivative of 3,12 - dihydroxy - 7 - ketocholanic acid esters wherein the acyl groups are lower aliphatic acyl radicals such as acetyl, propionyl, and the like. Various esters of this acid such as alkyl, aryl, and aralkyl are useful in our process, although we prefer to utilize lower alkyl esters such as methyl and ethyl esters since such esters are most readily prepared. Among the derivatives of 3,12-dihydroxy-7-ketocholanic acid suitable as starting materials might be mentioned 3,12-diacetoxy-7-ketocholanic acid, methyl 3,12-diacetoxy-7-ketocholanate, ethyl 3,12-diacetoxy-7-ketocholanate, ethyl 3,12-dipropionyloxy-7-ketocholanate, propyl 3,12-diacetoxy-7-ketocholanate, butyl 3,12-dibenzoxy-7-ketocholanate, and the like.

The preferred starting materials can be prepared in accordance with conventional methods by esterifying and acylating 3,12-dihydroxy-7-ketocholanic acid. This acid can be prepared by the process described in U. S. Patents 2,321,598 and 2,374,680. For example, methyl 3,12-diacetoxy-7-ketocholanate, which is particularly useful as a starting material in our process, is readily prepared by acetylating methyl 3,12-dihydroxy-7-ketocholanate with acetic anhydride in the presence of pyridine.

In accordance with our invention, the 3,12-diacyloxy-7-ketocholanic acid or ester is reacted with an acylating agent in the presence of an acid catalyst to produce the corresponding enol acylate. While various acylating agents can be used in carrying out this reaction, we have obtained particularly good results utilizing a lower aliphatic acid anhydride such as acetic anhydride, propionic anhydride, and the like, for this purpose. Similarly, while other acid catalysts such as sulfuric acid, alkali metal bisulfates, phosphoric acid, alkali metal acetates, and the like can be employed, we prefer to utilize p-toluenesulfonic acid for this purpose. In carrying out the acylation with acetic anhydride and p-toluenesulfonic acid, we have found that this reaction is conveniently effected by refluxing an excess of acetic anhydride with the 3,12-diacyloxy-7-ketocholanic acid or ester in the presence of p-toluenesulfonic acid. It is desirable that this reaction be carried out under anhydrous conditions and in the absence of air in order to permit the reaction to go to completion and achieve maximum yields.

The enol acylate formed by the process described above is readily recovered from the reaction mixture by evaporating the acylating agent. The residue so obtained, if desired, may be further purified by a chromatographic process. In this purification step the crude enol acylate is dissolved in a suitable organic solvent such as a petroleum hydrocarbon and the resulting solution is passed through a column of alumina. Upon eluting the column with a portion of fresh solvent and evaporating the solvent, a residue is obtained consisting essentially of the desired enol acylate.

In order to convert the enol acylate to the acylated desoxycholic acid ester, the enol acylate is reacted with hydrogen in the presence of a hydrogenation catalyst. We have found that this reaction is conveniently effected in a suitable medium such as acetic acid. While various hydrogenation catalysts are useful in carrying out this step of our process, we prefer to use a noble metal catalyst such as platinum oxide for this purpose. After the hydrogenation is complete, the catalyst is removed and the resulting solution is concentrated to obtain a residue consisting of the crude 3,12-acyloxycholonic acid ester.

The acylated desoxycholic acid or ester so obtained is readily hydrolyzed to the desired desoxycholic acid. For this purpose, we prefer to react the crude acylated product with an alkali such as potassium or sodium hydroxide in an aqueous alcoholic medium. After the hydrolysis is completed the excess of alkali is neutralized with acid causing precipitation of desoxycholic acid as an amorphous solid. If desired, this amorphous solid can be purified by crystallization from a suitable solvent such as acetone to obtain pure desoxycholic acid.

The following example is presented to illustrate a specific embodiment of our invention which is not to be construed as limited thereto.

*Example*

To a solution of 5.04 g. (0.01 mol) of methyl 3,12-diacetoxy-7-ketocholanate in 390 ml. (4.1 mols) of freshly distilled acetic anhydride was added 1.98 g. (0.0104 mol) of p-toluenesulfonic acid monohydrate. (Methyl 3,12-diacetoxy-7-ketocholanate may be prepared in accordance with the method of Gallagher et al., J. Biol. Chem. 147, p. 131). The air in the reaction system was replaced with nitrogen and the reaction mixture, protected from the atmosphere by a mercury trap, was heated to permit the slow distillation of acetic anhydride. When the volume had been reduced to about 50 ml. (about 3 hours of heating were required) the residual acetic anhydride was removed by heating on a steam bath under reduced pressure. The resulting dark residue was dissolved in ether and the ether layer was washed successively with three portions of cold water, a cold solution (1 N) sodium carbonate and finally again with cold water. After washing the resulting ether layer with a saturated solution of sodium chloride, it was finally dried over sodium sulfate. Upon evaporating the ether, a dark viscous oil containing the enol acetate of methyl 3,12-diacetoxy-7-ketocholanate was obtained. This product was then dissolved in about 100 ml. of Skelly Solve B (a commercial hexane fraction from petroleum) with heating and passed through a column containing 35 g. of acid washed alumina. The alumina column was eluted with about 700 ml. of Skelly Solve B.

The resulting filtered eluates were then evaporated on a steam bath under reduced pressure to yield a residue of about 4.3 g. consisting of the enol acetate of methyl 3,12-diacetoxy-7-ketocholanate. This product was then dissolved in about 75 ml. of acetic acid, about 0.40 g. of platinum oxide added and the resulting mixture reacted with hydrogen under pressure. After about one half of the theoretical amount of hydrogen had been adsorbed the hydrogen uptake ceased. At this point the catalyst was removed by filtration and the reaction with hydroyen was resumed after adding an additional 0.40 g. of fresh platinum oxide. The reaction thereupon went to completion and the theoretical amount of hydrogen was adsorbed.

At this point, the catalyst was removed from the resulting reaction mixture by filtration and the acetic acid evaporated under reduced pressure to yield a semicrystalline residue consisting of impure methyl 3,12-diacetoxycholanate. This residue was then reacted with 165 cc. of an alkaline solution prepared from 14 g. of potassium hydroxide in a mixture of 200 ml. of methylalcohol and 40 cc. of water for about 4 hours. After the hydrolysis was completed most of the alcohol was removed on a steam bath in a current of air. To the resulting cooled aqueous solution was added sufficient dilute hydrochloric acid to make the solution acid to Congo red paper. The desoxycholic acid precipitated from the acidified solution as an amorphous solid which was removed by filtration and washed free of mineral acid. The crude desoxycholic acid was crystallized from acetone yielding desoxycholic acid having a melting point of 173–173.5° C. Additional quantities of desoxycholic acid can be recovered from the mother liquors and purified by crystallization from acetone.

The desoxycholic acid obtained in this manner was identified by mixed melting point with authentic material (no depression), by failure to give a positive color reaction with tetranitromethane, and by the preparation of the methyl ester and of the methyl ester of the 3,12-diacetoxy derivative.

Various changes and modifications may be made in carrying out the present invention without departing from the spirit and scope thereof. Insofar as these changes and modifications are within the purview of the annexed claims, they are to be considered as part of our invention.

We claim:
1. The process for producing desoxycholic acid which comprises reacting a member selected from the group consisting of 3,12-diacyloxy-7-ketocholanic acid and esters thereof with an acylating agent in the presence of an acid catalyst to form the corresponding enol acylate, reacting said enol acylate with hydrogen in the presence of a noble metal catalyst to form the corresponding 3,12-diacyloxycholanic acid ester, and hydrolyzing said diacyloxy ester to produce desoxycholic acid.

2. The process for preparing desoxycholic acid which comprises reacting a 3,12-diacyloxy-7-ketocholanic acid ester with acetic anhydride in the presence of p-toluenesulfonic acid to form the corresponding enol acetate, reacting said enol acetate with hydrogen in the presence of a noble metal catalyst to form the corresponding 3,12-diacyloxycholanic acid ester, and subjecting said ester to alkaline hydrolysis to produce desoxycholic acid.

3. The process for preparing desoxycholic acid which comprises reacting a 3,12-diacetoxy-7-ketocholanic acid ester with acetic anhydride in the presence of p-toluenesulfonic acid to form the corresponding enol acetate, reacting said enol acetate with hydrogen in the presence of a platinum oxide catalyst to form the corresponding 3,12-diacetoxycholanic acid ester, and subjecting said ester to alkaline hydrolysis to produce desoxycholic acid.

4. The process for preparing desoxycholic acid which comprises reacting methyl 3,12-diacetoxy-7-ketocholanate with acetic anhydride in the presence of p-toluenesulfonic acid to form the corresponding enol acetate, reacting said enol acetate with hydrogen in the presence of platinum oxide catalyst to form the corresponding methyl 3,12-diacetoxycholanate, and hydrolyzing said ester by heating with alkali to form desoxycholic acid.

5. The process for preparing a 3,12-diacyloxycholanic acid ester which comprises reacting a 3,12-diacyloxy-7-ketocholanic acid ester with an acylating agent in the presence of an acid catalyst to form the corresponding enol acylate, and reacting said enol acylate with hydrogen in the presence of a noble metal catalyst to produce the 3,12-diacyloxycholanic acid ester.

6. The process for preparing 3,12-diacyloxycholanic acid ester which comprises reacting a 3,12-diacyloxy-7-ketocholanic acid ester with acetic anhydride in the presence of p-toluenesulfonic acid to form the corresponding enol acetate, and reacting said enol acetate with hydrogen in the presence of a noble metal catalyst to produce the 3,12-diacyloxycholanic acid ester.

7. The process for preparing a 3,12-diacetoxycholanic acid ester which comprises reacting a 3,12-diacetoxy-7-ketocholanic acid ester with acetic anhydride in the presence of p-toluenesulfonic acid to form the corresponding enol acetate, and reacting said enol acetate with hydrogen in the presence of platinum oxide to form the corresponding 3,12-diacetoxycholanic acid ester.

8. The process for preparing methyl 3,12-diacetoxycholanate which comprises reacting methy 3,12-diacetoxy-7-ketocholanate with acetic anhydride in the presence of p-toluenesulfonic acid to form the corresponding 7-enol acetate, and reacting said enol acetate with hydrogen in the presence of a platinum oxide catalyst to form methyl 3,12-diacetoxycholanate.

9. The process for preparing an enol acylate of a 3,12-diacyloxy-7-ketocholanic acid ester which comprises reacting said 3,12-diacyloxy-7-ketocholanic acid ester with an acylating agent in the presence of an acid catalyst, and recovering the corresponding enol acylate from the resulting reaction mixture.

10. The process for preparing an enol acetate of a 3,12-diacyloxy-7-ketocholanic acid ester which comprises reacting said 3,12-diacyloxy-7-ketocholanic acid ester with acetic anhydride in the presence of p-toluenesulfonic acid to form said enol acetate.

11. The process for preparing the enol acetate of methyl 3,12-diacetoxy-7-ketocholanate which comprises reacting methyl 3,12-diacetoxy-7-ketocholanate with acetic anhydride in the presence of p-toluenesulfonic acid, and recovering said enol acetate from the resulting reaction mixture.

12. The enol acetate of methyl 3,12-diacetoxy-7-ketocholanate.

13. The process for preparing a 3,12-diacyloxy cholanic acid ester which comprises reacting an enol acylate of a 3,12-diacyloxy-7-ketocholanic acid ester with hydrogen in the presence of a noble metal catalyst.

14. The process for preparing a 3,12-diacyloxy cholanic acid ester which comprises reacting an enol acetate of a 3,12-diacyloxy-7-ketocholanic acid ester with hydrogen in the presence of a noble metal catalyst.

15. The process for preparing methyl 3,12-diacetoxy cholanate which comprises reacting the enol acetate of methyl 3,12-diacetoxy-7-ketocholanate with hydrogen in the presence of a noble metal catalyst.

RALPH F. HIRSCHMANN.
NORMAN L. WENDLER.

No references cited.